(12) United States Patent
Gefen et al.

(10) Patent No.: US 11,356,324 B2
(45) Date of Patent: Jun. 7, 2022

(54) CHAOS ENGINEERING IN MICROSERVICES USING A SERVICE MESH

(71) Applicant: Dell Products, L.P., Round Rock, TX (US)

(72) Inventors: Avitan Gefen, Tel Aviv (IL); Roi Gamliel, Moshav Tkuma (IL)

(73) Assignee: DELL PRODUCTS, L.P., Round Rock, TX (US)

( * ) Notice: Subject to any disclaimer, the term of this patent is extended or adjusted under 35 U.S.C. 154(b) by 0 days.

(21) Appl. No.: 17/086,540

(22) Filed: Nov. 2, 2020

(65) Prior Publication Data
US 2022/0141304 A1    May 5, 2022

(51) Int. Cl.
| | |
|---|---|
| *H04L 41/0816* | (2022.01) |
| *H04L 67/567* | (2022.01) |
| *H04L 67/63* | (2022.01) |
| *H04L 45/00* | (2022.01) |
| *H04L 45/02* | (2022.01) |
| *H04L 67/1036* | (2022.01) |
| *G06F 9/445* | (2018.01) |
| *G06F 9/455* | (2018.01) |
| *G06F 11/34* | (2006.01) |

(52) U.S. Cl.
CPC .......... *H04L 41/0816* (2013.01); *G06F 9/445* (2013.01); *G06F 9/45533* (2013.01); *G06F 11/3452* (2013.01); *H04L 45/02* (2013.01); *H04L 45/38* (2013.01); *H04L 67/1036* (2013.01); *H04L 67/2838* (2013.01); *H04L 67/327* (2013.01)

(58) Field of Classification Search
CPC .... G06F 9/4881; G06F 9/5044; G06F 9/5027; G06F 9/5072; G06F 8/425; G06F 8/61; G06F 9/445; G06F 9/5077; G06F 9/45533; G06F 11/3006; G06F 11/3442; G06F 11/3447; G06F 11/3452; G06F 9/5083; H04L 41/0816; H04L 67/327; H04L 41/5058; H04L 29/08648; H04L 41/5006
See application file for complete search history.

(56) References Cited

U.S. PATENT DOCUMENTS

| | | | |
|---|---|---|---|
| 9,491,035 B1 * | 11/2016 | Pauley | G06F 9/45533 |
| 2012/0265569 A1 | 10/2012 | Gonzalez-Diaz et al. | |
| 2014/0101168 A1 | 4/2014 | Bayliss | |
| 2017/0123604 A1 | 5/2017 | Kone et al. | |

(Continued)

OTHER PUBLICATIONS

Wikipedia | Centrality, https://en.wikipedia.org/wiki/Centrality, 15 pages.

(Continued)

*Primary Examiner* — Kyung H Shin
(74) *Attorney, Agent, or Firm* — Amin, Turocy & Watson, LLP

(57) ABSTRACT

Techniques are provided for chaos engineering in microservices using a service mesh. In an example, a plurality of microservices can operate together as part of a software as a service product. A graph of the service mesh of the plurality of microservices can be determined. From that graph, weight can be assigned to the respective nodes. Those weights can be used to determine a probability of where chaos is introduced in the corresponding microservice architecture as part of chaos testing.

20 Claims, 11 Drawing Sheets

(56) References Cited

U.S. PATENT DOCUMENTS

| | | |
|---|---|---|
| 2018/0069806 A1 | 3/2018 | Kumar |
| 2019/0188049 A1* | 6/2019 | Choudhary ............. G06F 9/445 |
| 2020/0371896 A1* | 11/2020 | Mathur ............... G06F 11/3452 |
| 2021/0152659 A1* | 5/2021 | Cai ..................... H04L 41/0816 |
| 2021/0216444 A1 | 7/2021 | Gefen et al. |

OTHER PUBLICATIONS

Wikipedia | Conways' Law, https://en.wikipedia.org/wiki/Conway%27s_law, 2 pages.
Wikipedia | Modular programming, https://en.wikipedia.org/wiki/Modular_programming, 3 pages.
Burgan, Darrel | Microservices and Conway's Law, https://dzone.com/articles/microservices-and-conways-law, 4 pages.
Github | About code owners, https://docs.github.com/en/github/creating-cloning-and-archiving-repositories/about-code-ownersttabout-code-owners, 4 pages.
MacDonald, Andy. "Chaos Engineering: Chaos Testing Your HTTP Micro-Services—Failing to Succeed and Succeeding at Failing" Medium. May 20, 2019. Published online at [https://betterprogramming.pub/chaos-engineering-chaos-testing-your-http-micro-services-acc99d145515], retrieved Jan. 30, 2022, 8 pages.

\* cited by examiner

1000

( 1002 )
↓
DETERMINE A SERVICE MESH
GRAPH FOR MICROSERVICES
1004
↓
ASSIGN RESPECTIVE WEIGHTS
TO THE MICROSERVICES
BASED ON THE SERVICE MESH
GRAPH 1006
↓
SELECT A MICROSERVICE OF THE
MICROSERVICES FOR INDUCING
CHAOS BASED ON THE RESPECTIVE
WEIGHTS TO THE MICROSERVICES
1008
↓
( 1010 )

FIG. 10

000
CHAOS ENGINEERING IN MICROSERVICES USING A SERVICE MESH

TECHNICAL FIELD

The present application relates generally to performing testing of the resiliency of a computer system, particularly a computer system comprised of multiple microservices.

BACKGROUND

Microservices can generally be a variant of a service-oriented architecture (SOA) computer architectural style that structures an application as a collection of loosely coupled services. A benefit of decomposing an application into different, smaller services can be that it can improve modularity and make an application easier to understand, develop, and test. Such an approach can also parallelize development by permitting small, autonomous teams to develop, deploy, and scale their respective services independently. It is possible that each microservice of a system is developed and deployed independently—perhaps hundreds of times a day. Furthermore, microservices can be polyglot, and developed using different technology stacks (e.g., a programming language, and measured persistent technology).

Microservices can be deployed as part of a software as a service (SaaS) model, where a system of microservices is centrally hosted, is accessed by a thin client (e.g., a web browser), and is expected to be operational at all times. Operational up time can be measured by availability. Availability can be a measure of a system that identifies whether a user is able to use the service when he needs to use it. In SaaS architectures, availability can be measured by uptime, where 99.999% ("five 9s") uptime is aspired to.

Quality assurance can be applied to a SaaS architecture to validate the SaaS architecture. One approach in a quality assurance process can be chaos testing. Chaos testing can generally be a discipline of experimenting on a software system in order to build confidence in the system's capability to withstand turbulent and unexpected conditions. Chaos testing can be utilized to create continuous, random, or systemic failures to the system, and can test the ability of the system to overcome these failures.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which:

FIG. 10 illustrates another example process flow for chaos engineering in microservices using a service mesh, in accordance with certain embodiments of this disclosure;

DETAILED DESCRIPTION

Overview

Figure 1:
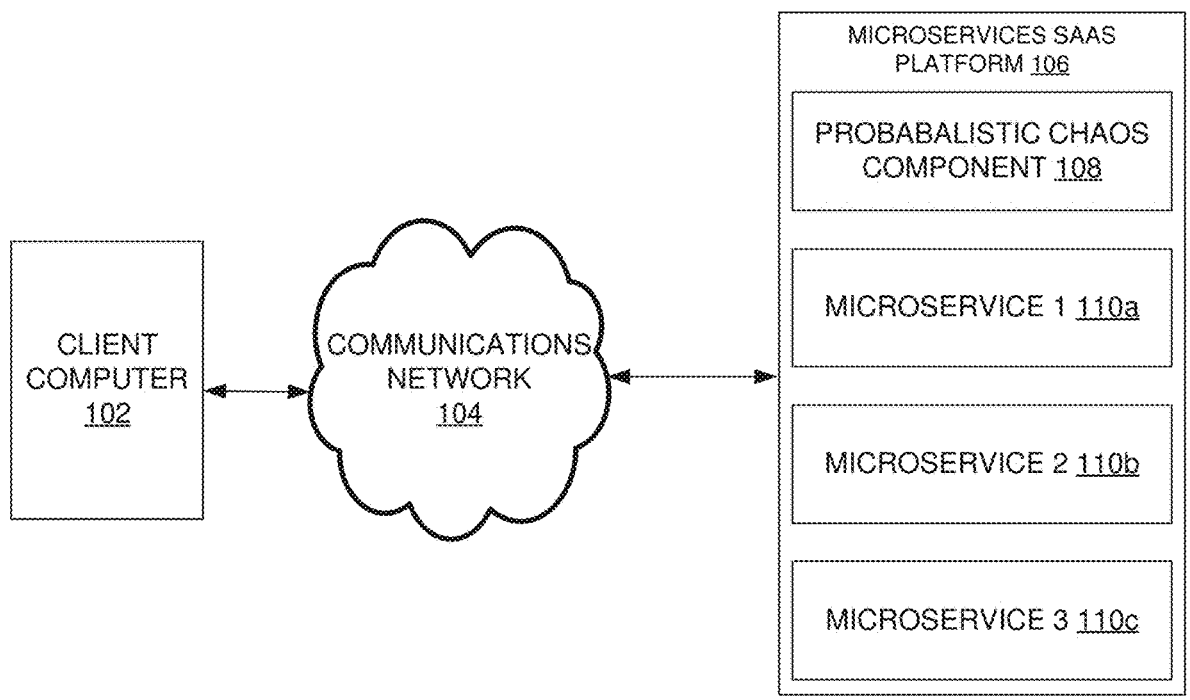
FIG. 1 illustrates an example system architecture that can facilitate chaos engineering in microservices using a service mesh, in accordance with certain embodiments of this disclosure.

An aim when developing a SaaS system can be to increase availability by reliability. Availability can be considered to be (uptime)/(uptime+downtime). Availability can also be considered to be (mean time to failure/mean time between failures)=(mean time to failure)/(mean time to diagnose+mean time to repair+mean time to failure).

This ratio can be increased by increasing mean time to failure, or by decreasing mean time to diagnose and/or mean time to repair. In a traditional product environment, a traditional approach is to increase mean time to failure. In some examples, mean time to diagnose can always be high (i.e., a customer first has to discover the error, then will likely try to fix it himself, then will raise a support call, the support call is escalated to engineering, etc.), and can be outside of a service provider's control. Mean time to repair can be minimized, but usually involves at least producing a fix, testing the fix, providing the fix to support, support providing the fix to the customer, and the customer applying the fix. Because of these high costs associated with mean time to diagnose and mean time to repair, an attempt can be made to minimize failures (and hence mean time to failure) through extensive checks and balances on products that are shipped to customers.

In contrast to a traditional product environment, with a SaaS environment, this equation can change. With proper operations monitoring in place, mean time to diagnose can be measured in minutes instead of days. Since SaaS can be a single-instance deployment, a viable approach can be to hack something together (e.g., a database, a configuration setting, or computer-executable code) to reduce mean time to repair. In some examples, a failure can be fixed without someone external noticing that there was a problem.

That is, in a SaaS environment there can be less pressure to reduce mean time to failure, because a (mean time to failure):(mean time between failure) ratio can be kept high by improving mean time between failure. This can be in contrast to increasing mean time to failure, where overheads and costs of increasing mean time to failure can impede an ability to accomplish things, which can cause an administrator to become risk averse and afraid to change anything in the system.

An approach to creating a low mean time to repair can involve utilizing disciplines such as chaos testing. In a microservices environment, tracking and monitoring potentially hundreds of microservices developed by different teams can introduce lots of complexity. There can be automatic intelligent tools that help reduce risk and help a quality assurance (QA) process.

According to aspects of the present techniques, a QA process can be improved by prioritizing where failures should be applied, where the prioritization is made through analyzing the system's service mesh. In some examples, graphical analysis over application programming interface (API) dependencies in a microservice environment can be performed to identify where to apply failures as part of chaos testing. Examples of these approaches can reduce mean time to repair, this lowering a time it takes a SaaS system to recover from a failure.

A chaos test can generally comprise applying a random test to a system (e.g., causing a microsystem not to respond), followed by assessing a set of assertions about the state of the system after the random test. A chaos test can be considered to succeed (i.e., the system operates properly despite the chaos) where all assertions succeed, and can be considered to fail (i.e., the system does not sufficiently operate properly due to the chaos) where at least one of the assertions fails.

The present techniques can be utilized to reduce a number of working hours for engineers by permitting them to focus more on implementation and development, and less on bug fixes. A faster time to production and a faster feature development of simpler and less-buggy code can improve resulting products. According to the present techniques, an ability to release new features faster and react faster to customer requests can elevate customer experience and satisfaction. The present techniques can be implemented to lower a mean time to diagnose of a system.

Example Architectures

FIG. 1 illustrates an example system architecture 100 that can facilitate chaos engineering in microservices using a service mesh, in accordance with certain embodiments of this disclosure. As depicted, system architecture 100 comprises client computer 102, communications network 104, and microservices SaaS platform 106. In turn, microservices SaaS platform 106 comprises probabilistic chaos component 108, microservice 1 110a, microservice 2 110b, and microservice 3 110c.

Figure 11:
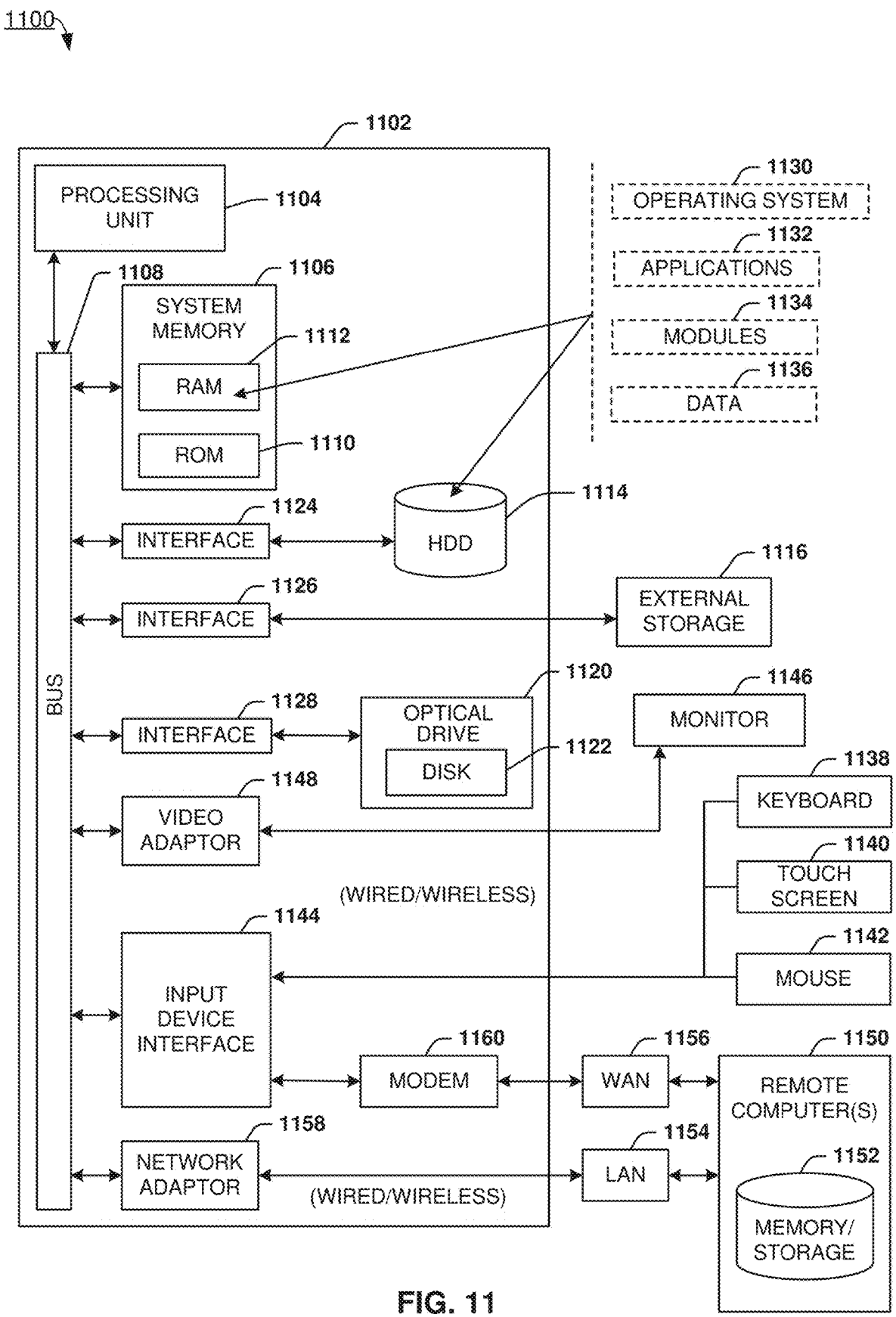
FIG. 11 illustrates an example block diagram of a computer operable to execute certain embodiments of this disclosure.

Each of client computer 102 and microservices SaaS platform 106 can be implemented with one or more instances of computer 1102 of FIG. 11. In some examples, microservices SaaS platform 106 comprises a distributed storage system that comprises multiple instances of computer 1102 of FIG. 11. In some examples, each of probabilistic chaos component 108, microservice 1 110a, microservice 2 110b, and microservice 3 110c can be implemented with machine-executable instructions and/or aspects of computer 1102 of FIG. 11.

Communications network 104 can comprise a computer communications network, such as the INTERNET, or an isolated private computer communications network.

Client computer 102 can access microservices SaaS platform 106 via communications network 104. In some examples, client computer 102 can access computer storage resources provided as SaaS by microservices SaaS platform 106. Microservices SaaS platform 106 can provide this SaaS via microservice 1 110a, microservice 2 110b, and microservice 3 110c working in conjunction, similar to the microservices service mesh system architecture 200 of FIG. 2.

Probabilistic chaos component 108 can be used to implement chaos testing on the SaaS provided by microservice 1 110a, microservice 2 110b, and microservice 3 110c. In some examples, probabilistic chaos component 108 can create a graph similar to graph 300 of FIG. 3 from microservice 1 110a, microservice 2 110b, and microservice 3 110c; assign weights based on this created graph (such as weights described with respect to graph 400 of FIG. 4) and use these weights to determine where in the microservices to introduce chaos as part of performing probabilistic chaos testing. In implementing chaos testing in this manner, probabilistic chaos component 108 can implement aspects of process flow 500 of FIG. 5, process flow 600 of FIG. 6, process flow 700 of FIG. 7, process flow 800 of FIG. 8, process flow 900 of FIG. 9, and process flow 1000 of FIG. 10.

Figure 2:
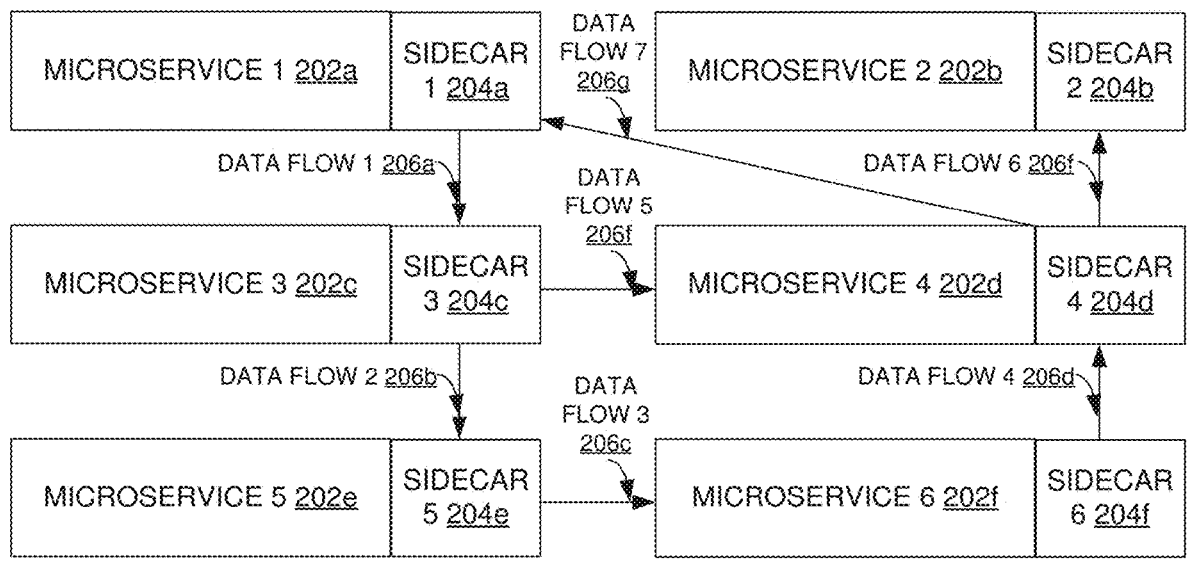
FIG. 2 illustrates an example system architecture of microservices in a service mesh that can facilitate chaos engineering in microservices using a service mesh, in accordance with certain embodiments of this disclosure.

FIG. 2 illustrates an example system architecture 200 of microservices in a service mesh that can facilitate chaos engineering in microservices using a service mesh, in accordance with certain embodiments of this disclosure. In some examples, system architecture 200 can be similar to a system architecture of a service mesh of microservice 1 110a, microservice 2 110b, and microservice 3 110c of FIG. 1, and can be controlled by probabilistic chaos component 108 of FIG. 1.

In some examples, a service mesh does not introduce new functionality into an application's runtime environment because the application already has rules to specify how requests get from point A to point B. A service mesh can differ from a traditional application in that a service mesh can take logic governing service-to-service communication out of individual services, and abstract it to a layer of infrastructure.

In a service mesh, requests can be routed between microservices through proxies in their own infrastructure layer. Individual proxies that make up a service mesh can be referred to as "sidecars," since they can run alongside each service, rather than within a service. Taken together, these sidecar proxies—decoupled from their respective services—can form a mesh network.

In some examples, where a service mesh is created, any logic (via microservices) can be added to the proxy.

As depicted, system architecture 200 comprises microservice 1 202a, microservice 2 202b, microservice 3 202c, microservice 4, 202d, microservice 5 202e, and microservice 6 202f. As depicted, system architecture 200 also comprises sidecar 1 204a (which corresponds to microservice 1 202a), sidecar 2 204b (which corresponds to microservice 2 202b), sidecar 3 204c (which corresponds to microservice 3 202c), sidecar 4 204d (which corresponds to microservice 4 202d), sidecar 5 204e (which corresponds to microservice 5 202e), and sidecar 6 204f (which corresponds to microservice 6 202f). This collection of microservices and sidecars can collectively be considered a service mesh, and can collectively operate as a SaaS product.

As depicted there are also data flows in system architecture 200. These data flows can be used by microservices to communicate, and be made using the microservices corresponding sidecars. As depicted, there are data flow 1 206a, data flow 2 206b, data flow 3 206c, data flow 4 206d, data flow 5 206e, data flow 6 206f, and data flow 7 206g.

Data flow 1 206a is from microservice 1 202a and to microservice 3 202c (via sidecar 1 204a and sidecar 3 204c, respectively). Regarding data flow 1 206a, microservice 1 202a can be said to be the producer, and microservice 202b can be said to be the consumer. Data flow 2 206b is from microservice 3 202c and to microservice 5 202e. Data flow 3 206c is from microservice 5 202e and to microservice 6 202f. Data flow 4 206d is from microservice 6 202f and to microservice 4 202d. Data flow 5 206e is from microservice 3 202c and to microservice 4 202d. Data flow 6 206f is from microservice 4 202d and to microservice 2 202b. Data flow 7 206g is from microservice 4 202d and to microservice 1 202a.

Figure 3:
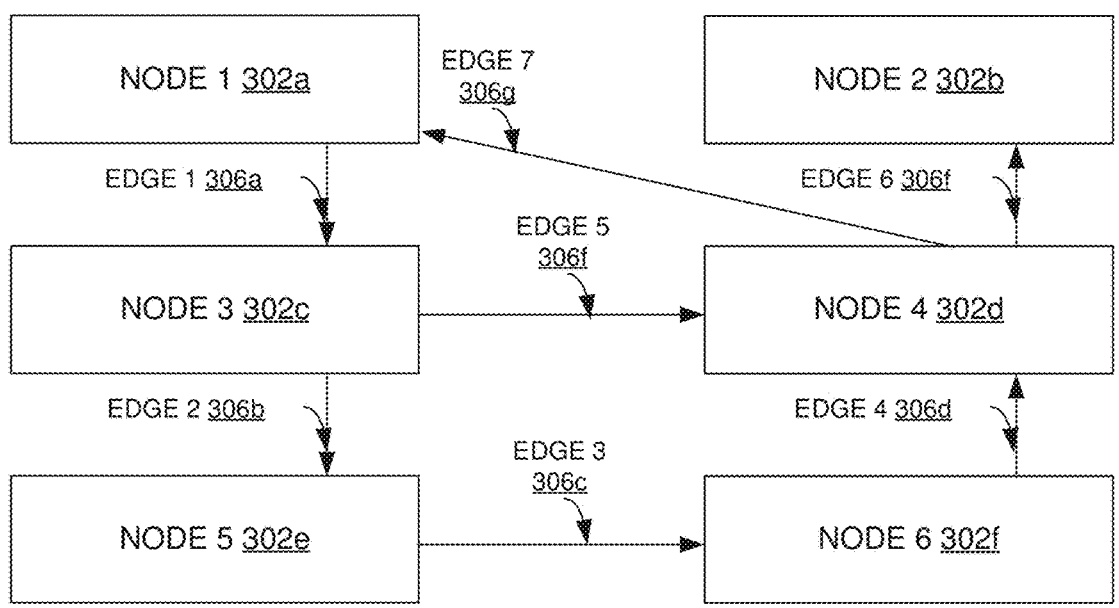
FIG. 3 illustrates an example graph formed from a plurality of microservices that can facilitate chaos engineering in microservices using a service mesh, in accordance with certain embodiments of this disclosure.

In some examples, a service mesh such as in system architecture 200 can be used to automatically create an API graph dependency, such as graph 300 of FIG. 3.

Example Graphs

FIG. 3 illustrates an example graph 300 formed from a plurality of microservices that can facilitate chaos engineering in microservices using a service mesh, in accordance with certain embodiments of this disclosure. In some examples, probabilistic chaos component 108 of FIG. 1 can generate example graph 300 from system architecture 200 of FIG. 2. That is, a structure of graph 300 can be deducted by generating a service mesh between the different microservices of system architecture 200 of FIG. 2. Graph 300 comprises a plurality of nodes and edges that connect the nodes. This can be distinguished from graph 400 of FIG. 4, where values are plotted in two-dimensional coordinate system.

In an example, a graph of the microservices can be generated based on a structure of API dependencies between the microservices. An approach to generating such an API graph can be utilize tools that adapt a service mesh. A service mesh can describe a network of microservices that make up a distributed application, and interactions between these microservices. As a service mesh grows in size and complexity, it can become harder to understand and manage. There can be tools that allow control over a service mesh, and provide behavioral insights and operational insights over the service mesh as a whole.

A central service can be provided that the proxies can send data to, such as probabilistic chaos component 108 of FIG. 1. For example, a first proxy (e.g., sidecar 1 204a of FIG. 2) associated with a first microservice (such as microservice 1 202a of FIG. 2) can relay a call (such as data 206-1) that the first microservice sends to a second microservice (such as microservice 3 202c of FIG. 2) associated with a second proxy (such as sidecar 3 204c of FIG. 2), and this data can also be sent to the central service. The central service can collect this data over time to generate an API graph.

By generating a graph, the central service can form a representation of a network structure. In a graph, a directed edge (u,v) can represent a scenario where microservice v consumes an API from microservice u. Put another way, microservice v can be a consumer and microservice u can be a producer in this relationship. In examples, u and v in the graph can be referred to as nodes of the graph.

An importance of nodes in the graph can be established. In some examples, each node can be assigned a value to represent a centrality of a node in the network. An example of a centrality approach can be a degree centrality, which measures how many connections a node has (both edges traveling into a node and edges traveling out of a node, in a directed graph).

In the examples where the graph is generated based on a service mesh, a node with a high degree of outbound edges can indicate that that node represents a microservice that is a producer for a high degree of microservice consumers.

Other centrality approaches that can be used include a closeness centrality, a betweenness centrality, and a PageRank centrality. A closeness centrality can measure a reciprocal of a sum of lengths of shortest paths between a given node and other nodes in the graph. A Betweenness centrality can measure, for a given node, a number of shortest paths between other nodes of a graph that pass through that given node. A PageRank centrality can measure both a number and quality of inbound edges to a given node.

In some examples, multiple centrality measures can be utilized to each generate a centrality score (CS) for each node of a graph. Each of these centrality scores can be normalized and then summed for each node using the equation $$CS(n_j) = \sum_{i \in l} \frac{C_i(n_j)}{\Sigma(C_i)}$$

Where CS is a centrality score, $n_j$ represents a node, $C_i$ represents a particular centrality measure, and l is the set of centrality measures used.

In some examples, the edges of the network can be treated as undirected for the purpose of calculating a centrality score. In other examples, separate centrality scores for a particular node can be measured using inbound connections, and using outbound connections.

A result of determining centrality scores for nodes of a graph can be to produce a sorted list of nodes according to their centrality score, which can be referred to as a centrality node list. A failure in a central node (one with a high centrality score) can be more dangerous than a failure in another node (one with a lower centrality score) because the central node can be serving more consumer microservices, or can be a bridge to other consumers.

Using a centrality node list, chaos testing can be performed as follows. A place in a plurality of microservices where chaos is applied can be defined. In some examples, the more important a node is in the graph, the more likely a random failure can be applied to the microservice that corresponds to that node. After a microservice is selected, a failure can be applied to it, and a set of assertions can be run.

A centrality node list can be ordered by a chosen centrality score used in evaluating nodes of the graph. In examples where there is limited time to perform chaos testing, microservices can be selected based on their order. In other examples where time allows for running multiple tests per microservice, an approach can be made to randomly choose a microservice each round. Such an approach can be expressed as:

While time<threshold
Pick a node from the centrality node list using their probabilities
Apply a failure to the corresponding microservice and run a chaos test In various examples, several approaches can be taken to assigning a probability to a node in the centrality node list, which can affect a number of times that a node is chosen from the centrality node list. An example approach can be to normalize all the scores of the nodes and choose this as a probability to pick a node. For example, there can be nodes n1 and n2, with scores of 2 and 1, respectively. After normalization, the scores can be ⅔ and ⅓. This can indicate that node n1 will be chosen ⅔ of the time, while node n2 will be chosen ⅓ of the time.

Graph 300 can represent a network of a microservices environment. In an example, outgoing degree-centrality can be used for a centrality score. As depicted, graph 300 is composed of six nodes, which each correspond to a microservice of system architecture 200 of FIG. 2. That is, graph 300 comprises node 1 302*a* (corresponding to microservice 1 202*a* of FIG. 2), node 2 302*b* (corresponding to microservice 2 202*b* of FIG. 2), node 3 302*c* (corresponding to microservice 3 202*c* of FIG. 2), node 4 302*d* (corresponding to microservice 4 202*d* of FIG. 2), node 5 302*e* (corresponding to microservice 5 202*e* of FIG. 2), and node 6 302*f* (corresponding to microservice 6 202*f* of FIG. 2).

Graph 300 also comprises a plurality of directed edges between nodes, and these directed edges can correspond to data flow in system architecture 200. Graph 300 comprises directed edge 1 306*a* (which corresponds to data flow 1 206*a* of FIG. 2), directed edge 2 306*b* (which corresponds to data flow 2 206*b* of FIG. 2), directed edge 3 306*c* (which corresponds to data flow 3 206*c* of FIG. 2), directed edge 4 306*d* (which corresponds to data flow 4 206*d* of FIG. 2), directed edge 5 306*e* (which corresponds to data flow 5 206*e* of FIG. 2), and directed edge 6 306*f* (which corresponds to data flow 6 206*f* of FIG. 2).

From graph 300, the following example centrality scores can be determined, based on a number of outbound edges for a node. In this example node 1 302*a* has a centrality score of 1, node 2 302*b* has a centrality score of 0, node 3 302*c* has a centrality score of 2, node 4 302*d* has a centrality score of 2, node 5 302*e* has a centrality score of 1, and node 6 302*f* has a centrality score of 1.

A centrality node list based on these centrality scores can be (node 3 302*c*, node 4 302*d*, node 1 302*a*, node 5 302*e*, node 6 302*f*, and node 2 302*b*). Using their respective centrality score as a probability to be picked, their related normalized scores can be (2/7, 2/7, 1/7, 1/7, 1/7, 0). In some examples, a node with a score of zero can be adjusted to a small positive number to avoid a situation where there is zero probability of choosing a node. In this example, where a node that otherwise has a score of zero is adjusted to have a small positive value, each of node 3 302*c* and node 4 302*d* can be chosen 28% of the time; each of node 1 302*a*, node 5 302*e*, and node 6 302*f* can be chosen 14% of the time; and node 2 302*b* can be chosen 2% of the time.

Figure 4:
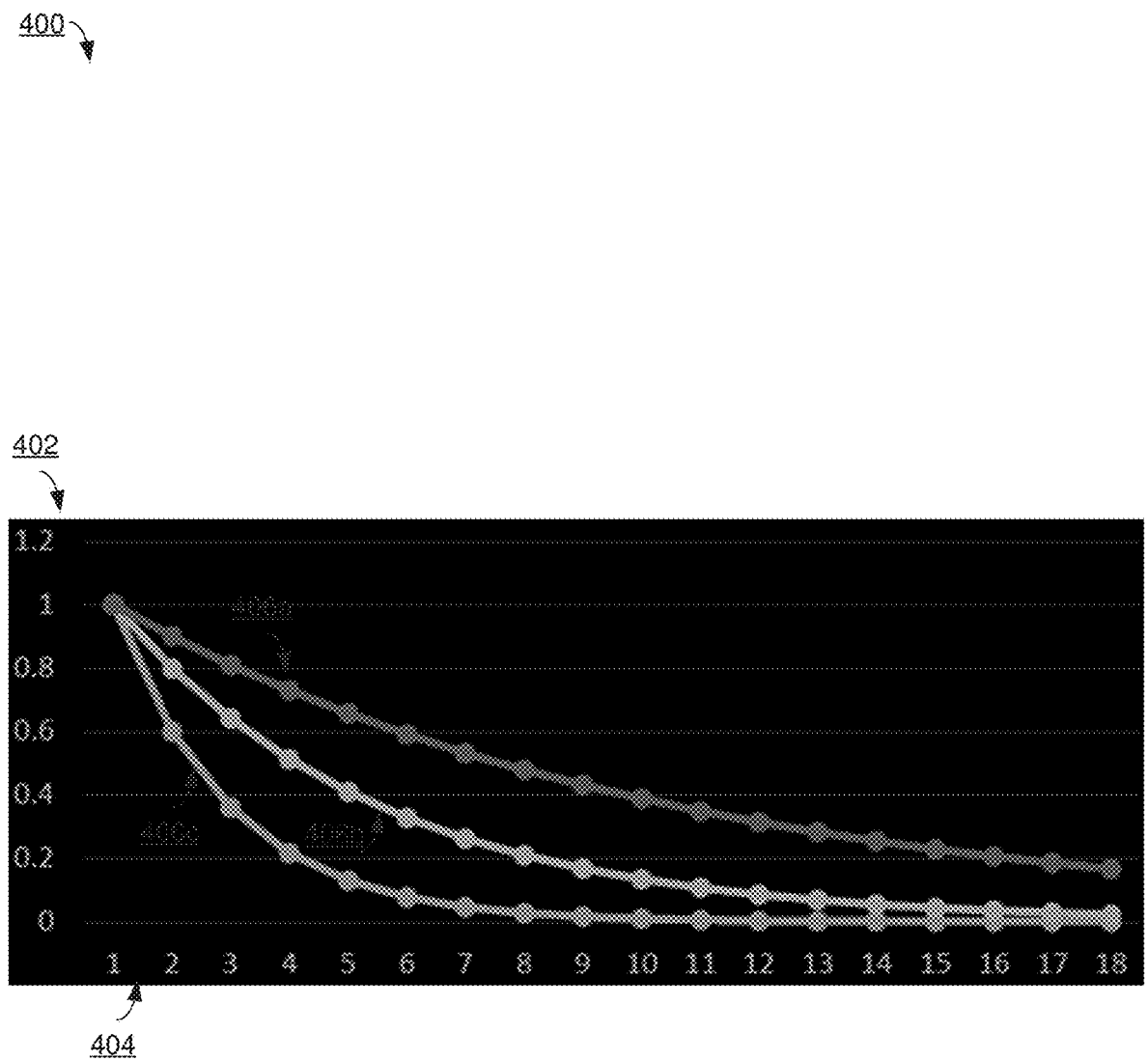
FIG. 4 illustrates an example exponential decay graph that can be utilized to assign a weight to a microservice to facilitate chaos engineering in microservices using a service mesh, in accordance with certain embodiments of this disclosure.

FIG. 4 illustrates an example exponential decay graph 400 that can be utilized to assign a weight to a microservice to facilitate chaos engineering in microservices using a service mesh, in accordance with certain embodiments of this disclosure. Where a centrality node list is generated using graph 300 of FIG. 3 (e.g., a centrality node list of (node 3 302*c*, node 4 302*d*, node 1 302*a*, node 5 302*e*, node 6 302*f*, and node 2 302*b*)), the nodes in the centrality node list can be assigned respective probabilities in being chosen for introducing chaos using values from exponential decay graph 400. Graph 400 comprises values that are plotted in two-dimensional coordinate system. This can be distinguished from graph 300 of FIG. 3, which comprises a plurality of nodes and edges that connect the nodes.

Graph 400 comprises y-axis 402, which represents a value to assign to a node, and x-axis 404, which represents a node in a centrality node list that a value is to be assigned to. Then, graph 400 comprises three example exponential decays—exponential decay 406*a*, exponential decay 406*b*, and exponential decay 406*c*. These different exponential decays can have differing values that are assigned to nodes of a centrality node list, and can differ from each other based on having different input values used to create each respective exponential decay.

Once values from an exponential decay are assigned to the nodes of a centrality node list, the centrality node list's values can be normalized, so that the cumulative probability of all the nodes of the centrality node list being selected for chaos totals 100%.

Example Process Flows

Figure 5:
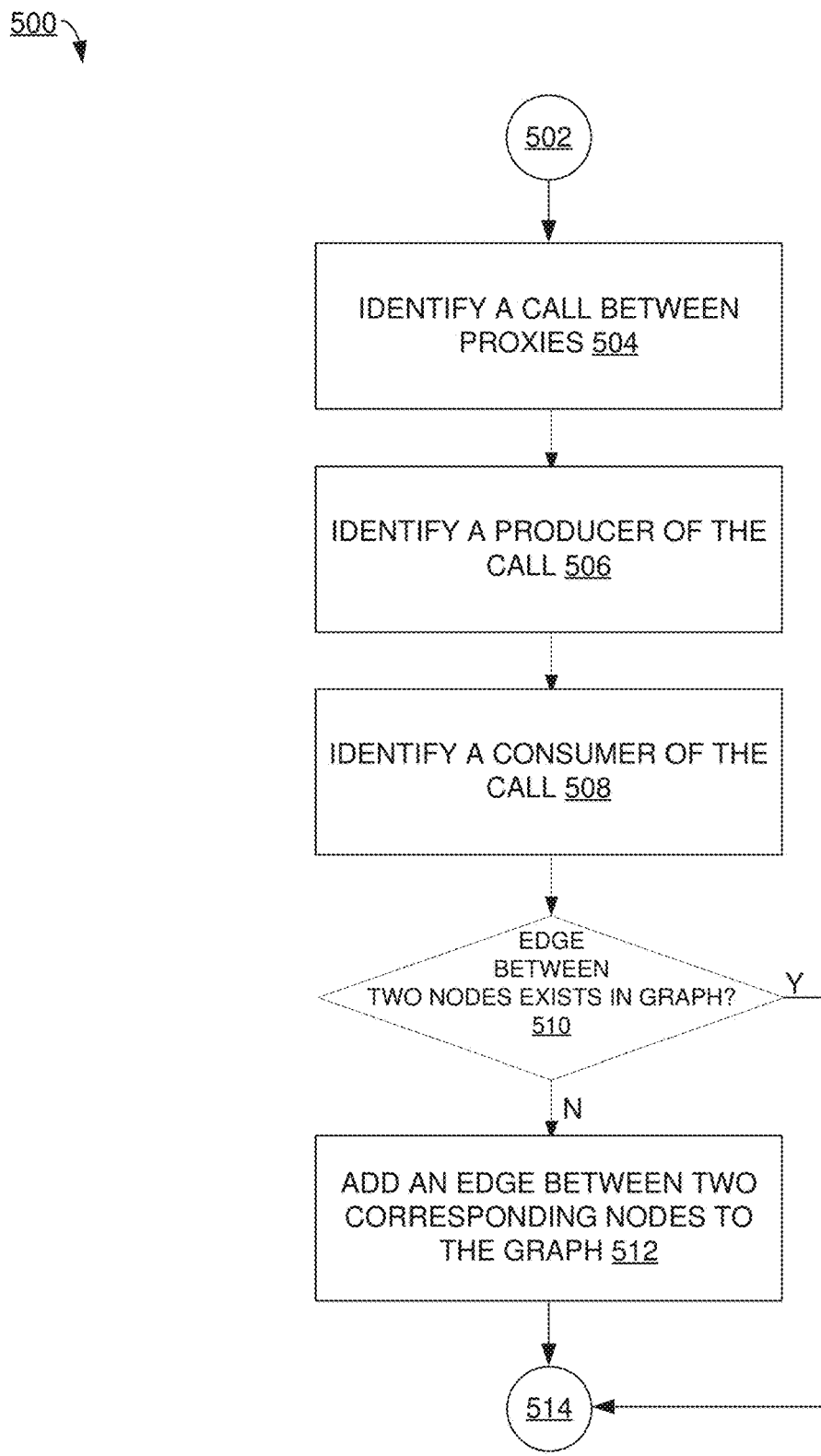
FIG. 5 illustrates an example process flow for generating a graph of a plurality of microservices to facilitate chaos engineering in microservices using a service mesh, in accordance with certain embodiments of this disclosure.

FIG. 5 illustrates an example process flow 500 for generating a graph of a plurality of microservices to facilitate chaos engineering in microservices using a service mesh, in accordance with certain embodiments of this disclosure. In some examples, aspects of process flow 500 can be implemented by probabilistic chaos component 108 of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with aspects of one or more of process flow 600 of FIG. 6, process flow 700 of FIG. 7, process flow 800 of FIG. 8, process flow 900 of FIG. 9, and process flow 1000 of FIG. 10.

Process flow 500 begins with 502, and moves to operation 504.

Operation 504 depicts identifying a call between proxies. In some examples, probabilistic chaos component 108 of FIG. 1 can be sent a copy of a call made between two proxies, such as between sidecar 1 204*a* and sidecar 2 204*b* of FIG. 2. When sidecar 1 204*a* sends data flow 1 206*a* to sidecar 2 204*b*, sidecar 1 204*a* can also send a copy of data flow 1 206*a* to probabilistic chaos component 108.

In other examples, probabilistic chaos component 108 can examine the microservices it controls to determine what calls those microservices can or will make when the microservices are in operation as part of SaaS. After operation 504, process flow 500 moves to operation 506.

Operation 506 depicts identifying a producer of the call. A producer of the call can be the microservice that originates the call. Continuing with the example of operation 504, this can be microservice 1 202*a* of FIG. 2, which originates data flow 1 206*a*. The producer of the call can be identified from a known part of the call itself. After operation 506, process flow 500 moves to operation 508.

Operation 508 depicts identifying a consumer of the call. A consumer of the call can be the microservice that receives the call. Continuing with the example of operation 504, this can be microservice 3 202*c* of FIG. 2, which receives data flow 1 206*a*. The receiver of the call can be identified from a known part of the call itself. After operation 508, process flow 500 moves to operation 510.

Operation 510 depicts determining whether an edge between two corresponding nodes exists in a graph. That is, operation 510 can comprise determining whether a graph (e.g., graph 300 of FIG. 3)

Where it is determined in operation 510 that an edge between two corresponding nodes exists in the graph, process flow moves to 514, where process flow 500 ends. Instead, where it is determined in operation 510 that an edge between two corresponding nodes does not exist in the graph, process flow moves to operation 512.

Operation 512 is reached from operation 510 where it is determined in operation 510 that an edge between two corresponding nodes does not exist in the graph. Operation 512 depicts adding an edge between two corresponding nodes to the graph.

In examples where one or more of the nodes also does not exist in the graph, operation 512 can comprise adding the one or more nodes to the graph. Where the producer of the call is microservice 1 202a and the consumer is microservice 3 202c, this can comprise determining whether the graph already contains corresponding nodes—e.g., node 1 302a and node 3 302c.

Using the example of graph 300 of FIG. 3, if edge 306a has not yet been added to graph 300, then it can be added to graph 300. In this manner, a graph that represents a service mesh of a set of microservices of a SaaS product can be built by analyzing the calls made among those microservices.

By performing multiple iterations of process flow 500 as multiple calls are made between microservices, a service mesh graph can be created that represents the corresponding microservice system architecture.

After operation 512, process flow 500 moves to 514, where process flow 500 ends.

Figure 6:
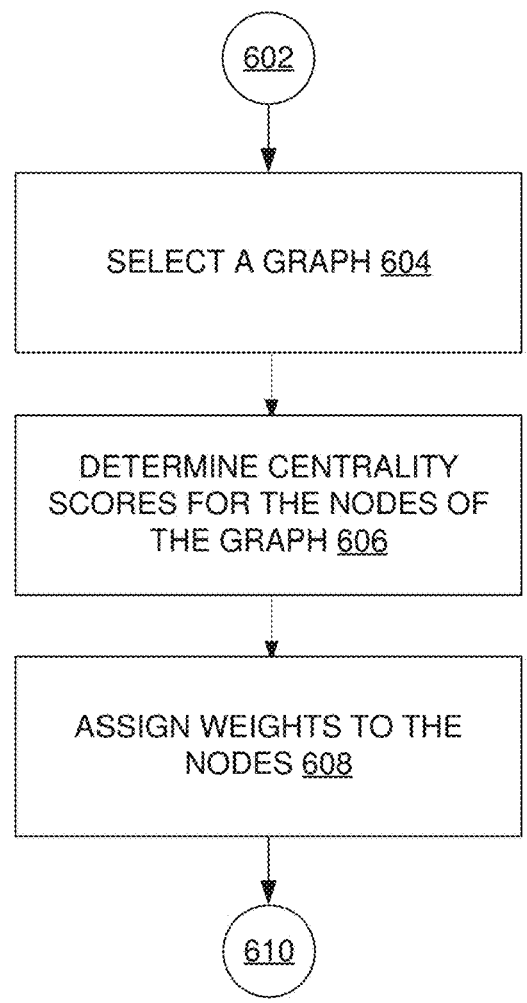
FIG. 6 illustrates an example process flow for assigning a weight to microservices based on a graph of the microservices to facilitate chaos engineering in microservices using a service mesh, in accordance with certain embodiments of this disclosure.

FIG. 6 illustrates an example process flow 600 for assigning a weight to microservices based on a graph of the microservices to facilitate chaos engineering in microservices using a service mesh, in accordance with certain embodiments of this disclosure. In some examples, aspects of process flow 600 can be implemented by probabilistic chaos component 108 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with aspects of one or more of process flow 500 of FIG. 5, process flow 700 of FIG. 7, process flow 800 of FIG. 8, process flow 900 of FIG. 9, and process flow 1000 of FIG. 10.

Process flow 600 begins with 602, and moves to operation 604.

Operation 604 depicts selecting a graph. Where one component (e.g., probabilistic chaos component 108 of FIG. 1) is responsible for chaos testing of multiple SaaS products, this can comprise selecting a graph that corresponds to a particular SaaS product for which chaos testing will be performed. These graphs can be stored in a known location of a computer memory that is accessible by probabilistic chaos component 108. An example of such a graph can be graph 300 of FIG. 3. After operation 604, process flow 600 moves to operation 606.

Operation 606 depicts determining centrality scores for the nodes of the graph. These centrality scores can be determined in a variety of ways, such as by determining an outgoing degree-centrality, or another centrality value such as described with respect to FIG. 3. After operation 606, process flow 600 moves to operation 608.

Operation 608 depicts assigning weights to the nodes. Assigning a weight to the nodes (which can be referred to as assigning a probability or a value) can be performed in a similar manner as assigning a probability to the nodes of a centrality node list as is described with respect to FIG. 3.

After operation 608, the nodes of a graph can have weights assigned to them, and these weights can be used by probabilistic chaos component to determine which microservice(s) to introduce chaos to as part of chaos testing. After operation 608, process flow 600 moves to 610, where process flow 600 ends.

Figure 7:
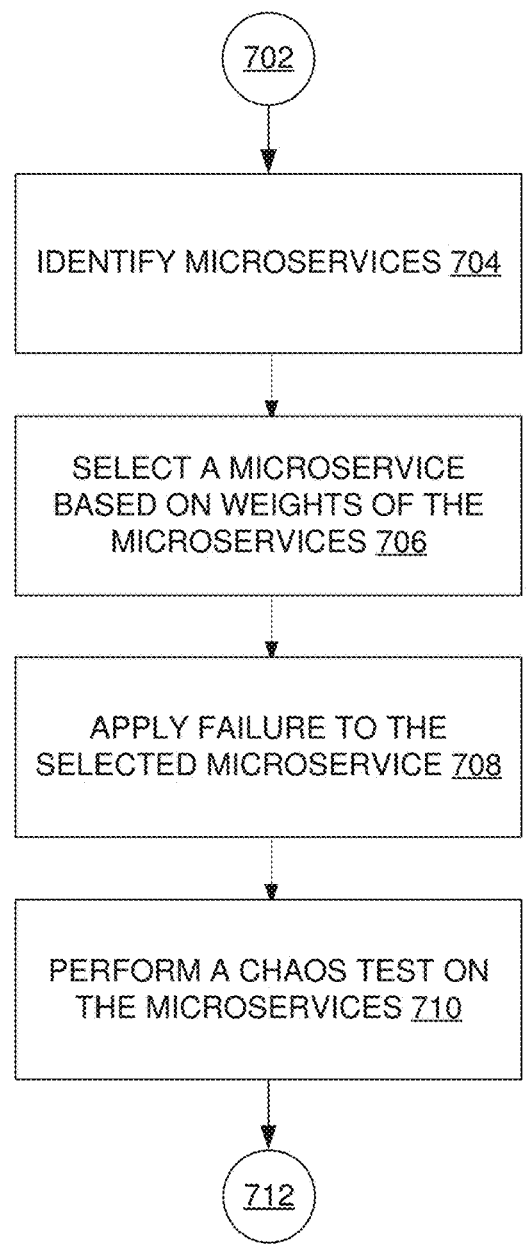
FIG. 7 illustrates an example process flow for performing chaos on weighted microservices to facilitate chaos engineering in microservices using a service mesh, in accordance with certain embodiments of this disclosure.

FIG. 7 illustrates an example process flow 700 for performing chaos on weighted microservices to facilitate chaos engineering in microservices using a service mesh, in accordance with certain embodiments of this disclosure. In some examples, aspects of process flow 700 can be implemented by probabilistic chaos component 108 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with aspects of one or more of process flow 500 of FIG. 5, process flow 600 of FIG. 6, process flow 800 of FIG. 8, process flow 900 of FIG. 9, and process flow 1000 of FIG. 10.

Process flow 700 begins with 702, and moves to operation 704.

Operation 704 depicts identifying microservices. These can be the microservices of a SaaS product, such as the microservices of FIG. 1 or the microservices of FIG. 2. In some examples, probabilistic chaos component 108 of FIG. 1 can store a representation of the microservices of a SaaS product in a known location of a computer memory. In such examples, operation 704 can comprise accessing this stored information about the microservices of a particular SaaS product. After operation 704, process flow 700 moves to operation 706.

Operation 706 depicts selecting a microservice based on weights of the microservices. These can be the weights determined according the process flow 600 of FIG. 6. Using the example of system architecture 200 of FIG. 2 and graph 300 of FIG. 3, operation 706 can comprise selecting each of microservice 3 202c and microservice 4 202d (corresponding to node 3 302c and node 4 302d) 28% of the time; each of microservice 1 202a, microservice 5 202e, and microservice 6 202f (corresponding to node 1 302a, node 5 302e, and node 6 302f) 14% of the time; and selecting microservice 2 202b (corresponding to node 2 302b) 2% of the time. After operation 706, process flow 700 moves to operation 708.

Operation 708 depicts applying failure to the selected microservice. Applying a failure can take several forms. For example, applying a failure can comprise introducing a latency in communications to and/or from the selected microservice, terminating the selected microservice, or terminating a container, a file system, or a kernel associated with the selected microservice. After operation 708, process flow 700 moves to operation 710.

Operation 710 depicts performing a chaos test on the microservices. Performing a chaos test can comprise determining how the SaaS product performs upon the introduction of chaos in operation 708. This can comprise assessing a set of assertions about the state of the system after introducing the chaos. A chaos test can be considered to succeed (i.e., the system operates properly despite the chaos) where all assertions succeed, and can be considered to fail (i.e., the system does not sufficiently operate properly due to the chaos) where at least one of the assertions fails.

In some examples, multiple failures (in operation 708) can be applied to multiple microservices, either at once or at varying points of time. Chaos testing can be performed to see how the SaaS product performs under these stresses. After operation 710, process flow 700 moves to 712, where process flow 700 ends.

Figure 8:
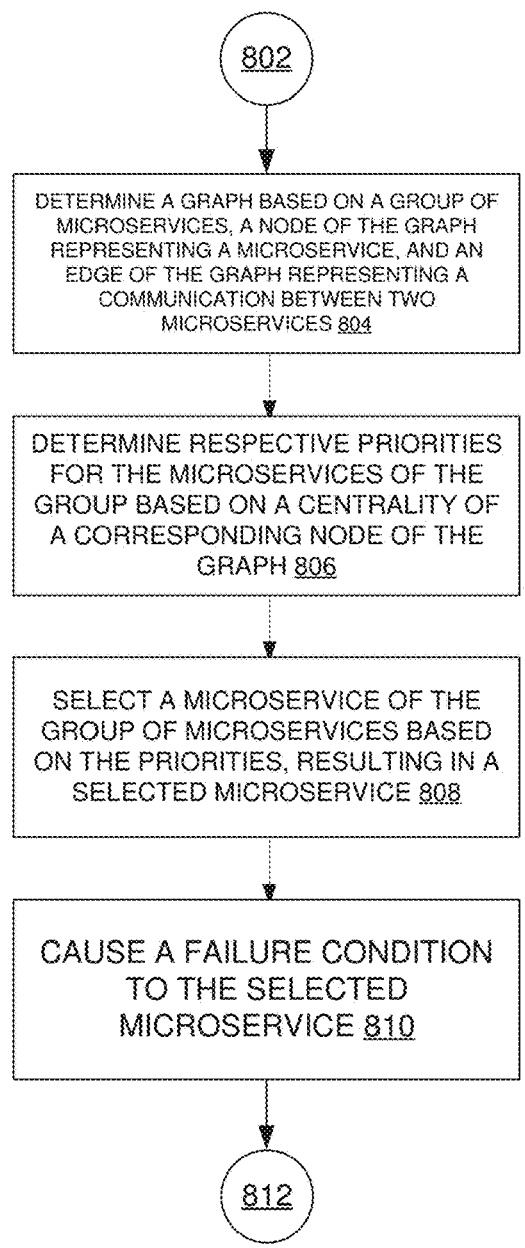
FIG. 8 illustrates an example process flow for chaos engineering in microservices using a service mesh, in accordance with certain embodiments of this disclosure.

FIG. 8 illustrates an example process flow 800 for chaos engineering in microservices using a service mesh, in accordance with certain embodiments of this disclosure. In some examples, aspects of process flow 800 can be implemented by probabilistic chaos component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with aspects of one or more of process flow 500 of FIG. 5, process flow 600 of FIG. 6, process flow 700 of FIG. 7, process flow 900 of FIG. 9, and process flow 1000 of FIG. 10.

Process flow 800 begins with 802, and moves to operation 804.

Operation 804 depicts determining a graph based on a group of microservices, a node of the graph representing a microservice of the group of microservices, and an edge of the graph representing a communication between two microservices of the group of microservices.

In some examples, performing the determining of the graph is performed by a component that is separate from the group of microservices. That is, using the example of system architecture of FIG. 1, probabilistic chaos component 108 can perform the determining the graph, and probabilistic chaos component 108 can be separate from the microservices that collectively provide a SaaS product—microservice 1 110*a*, microservice 2 110*b*, and microservice 3 110*c*.

In some examples, the group of microservices sends information about data transfer between the microservices of the group to the component. This can be performed in a similar manner as operation 504 of FIG. 5.

In some examples, the component identifies a first node of the graph as a source of the data transfer between the microservices, and identifies a second node of the graph as a destination of the data transfer between the microservices. That is, the component can create a representation of the microservice system architecture in the graph, where each node represents a microservice. The source of the data can be referred to as the producer, and the destination of the data can be referred to as the consumer.

In some examples, the component identifies the edge of the graph as the edge between the source and the destination. That is, the edge represents a communication, or data flow, between the source microservice and the destination microservice.

In some examples, analyzing the microservice of the group of microservices to determine what other microservices of the group of microservices to which the microservice is configured to send data. That is, in some examples, machine-readable instructions of a particular microservice can be analyzed to determine other microservices that the particular microservice will send a communications to, and other microservices that the particular microservice will receive communications from. The graph can be generated based on information gleaned from this analysis.

After operation 804, process flow 800 moves to operation 806.

Operation 806 depicts determining respective priorities for the microservices of the group based on a centrality of a corresponding node of the graph. In some examples, operation 806 comprises normalizing the respective priorities for the microservices of the group before performing the selecting of the microservice. That is, where the microservices are assigned priorities that represent a percentage chance of being selected, these priorities can be normalized so that they total 100%. Where a centrality node list has priorities of (2, 2, 1), this can be normalized as (40%, 40%, 20%).

After operation 806, process flow 800 moves to operation 808.

Operation 808 depicts selecting a microservice of the group of microservices based on the priorities, resulting in a selected microservice. In some examples, operation 808 can be implemented in a similar manner as operation 706 of FIG. 7.

After operation 808, process flow 800 moves to operation 810.

Operation 810 depicts causing a failure condition to the selected microservice. In some examples, operation 810 can be implemented in a similar manner as operation 708 of FIG. 7.

After operation 810, process flow 800 moves to 812, where process flow 800 ends.

Figure 9:
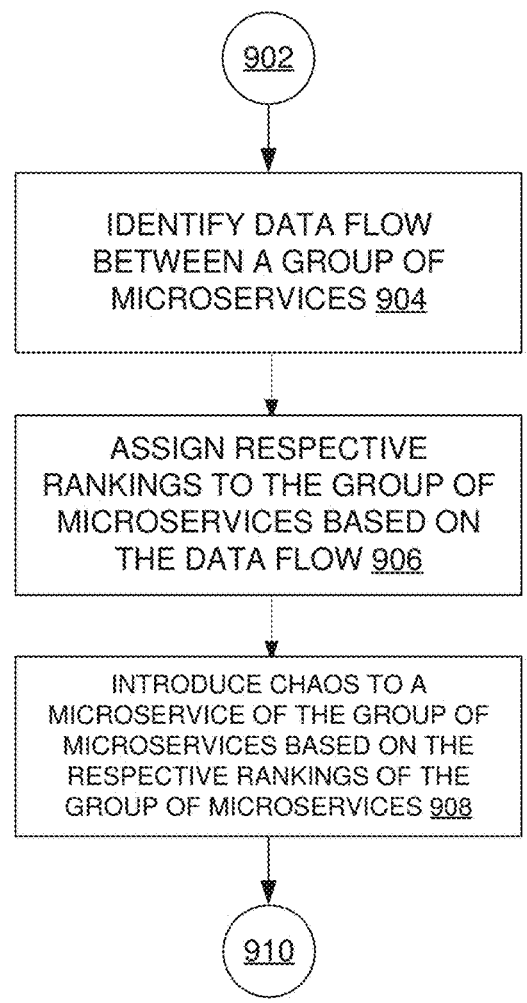
FIG. 9 illustrates another example process flow for chaos engineering in microservices using a service mesh, in accordance with certain embodiments of this disclosure.

FIG. 9 illustrates another example process flow 900 for chaos engineering in microservices using a service mesh, in accordance with certain embodiments of this disclosure. In some examples, aspects of process flow 900 can be implemented by probabilistic chaos component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with aspects of one or more of process flow 500 of FIG. 5, process flow 600 of FIG. 6, process flow 700 of FIG. 7, process flow 800 of FIG. 8, and process flow 1000 of FIG. 10.

Process flow 900 begins with 902, and moves to operation 904.

Operation 904 depicts identifying data flow between a group of microservices. In some examples, operation 904 can be implemented in a similar manner as operation 804 of FIG. 8. This data flow can involve determining an actual data flow between microservices. In other examples, this can comprise analyzing the machine-executable instructions of the microservices to determine which other microservices they have a data flow with.

After operation 904, process flow 900 moves to operation 906.

Operation 906 depicts assigning respective rankings to the group of microservices based on the data flow. In some examples, operation 906 can be implemented in a similar manner as operation 806 of FIG. 8. In some examples, operation 906 comprises applying an exponential decay series to the group of microservices, such as an exponential decay series depicted in graph 400 of FIG. 4.

In some examples, operation 906 comprises determining respective centrality scores for the group of microservices. In some examples, the centrality scores can be based on inbound edges to a node, and operation 906 can comprise determining a number of inbound edges of a graph based on performing the identifying of the data flow. In some examples, the centrality scores can be based on outbound edges to a node, and operation 906 can comprise determining a number of outbound edges of a graph based on performing the identifying of the data flow. In some examples, the centrality scores can be based on edges to a node that are treated as undirected, and operation 906 can comprise treating edges of a graph as undirected, the graph being based on performing the identifying of the data flow.

After operation 906, process flow 900 moves to operation 908.

Operation 908 depicts introducing chaos to a microservice of the group of microservices based on the respective rankings of the group of microservices. In some examples, operation 908 can be implemented in a similar manner as operations 808 and 810 of FIG. 8. In some examples, introducing chaos to a microservice comprises causing a failure of the microservice.

After operation 908, process flow 900 moves to 910, where process flow 900 ends.

FIG. 10 illustrates another example process flow 1000 for chaos engineering in microservices using a service mesh, in accordance with certain embodiments of this disclosure. In some examples, aspects of process flow 1000 can be implemented by probabilistic chaos component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with aspects of one or more of process flow 500 of FIG. 5, process flow 600 of FIG. 6, process flow 700 of FIG. 7, process flow 800 of FIG. 8, and process flow 900 of FIG. 9.

Process flow 1000 begins with 1002, and moves to operation 1004.

Operation 1004 depicts determining a service mesh graph for microservices. In some examples, operation 1004 can be implemented in a similar manner as operation 804 of FIG. 8. In some examples, the microservices comprise a plurality of microservices each having a proxy of a plurality of proxies, the plurality of proxies routing communications between the plurality of microservices. That is, the microservices can be part of a system architecture similar to system architecture 200 of FIG. 2.

After operation 1004, process flow 1000 moves to operation 1006.

Operation 1006 depicts assigning respective weights to the microservices based on the service mesh graph. In some examples, operation 1006 can be implemented in a similar manner as operation 804 of FIG. 8.

In some examples, operation 1006 comprises determining that the microservice has been assigned a weight of zero, and increasing the weight of the microservice to a value above zero. In some examples, this can be implemented in a similar manner as the example of FIG. 3, where node 2 302*b* is initially given a centrality score of zero, and that value is modified so that node 2 302*b* is chosen 2% of the time.

In some examples, operation 1006 comprises selecting the microservice based on the microservice having a largest weight of the microservices. In some examples—for instance, where there is limited time to perform chaos testing—a microservice with the largest weight can be selected, as opposed to giving each microservice a probability of being selected.

After operation 1006, process flow 1000 moves to operation 1006.

Operation 1008 depicts selecting a microservice of the microservices for inducing chaos based on the respective weights to the microservices. In some examples, operation 1008 can be implemented in a similar manner as operation 808 of FIG. 8. In some examples, a first weight of the microservice indicates a probability that the microservice will be selected among the microservices for inducing chaos.

In some examples where the microservice is a first microservice, operation 1008 comprises, in response to determining that less than a threshold amount of time has elapsed, selecting a second microservice of the microservices for inducing chaos based on the respective weights to the microservices. That is, chaos testing can be performed by introducing chaos at multiple points in a microservice system architecture.

After operation 1008, process flow 1000 moves to 1010, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, aspects of computing environment 1100 can be used to implement aspects of client computer 102, microservices SaaS platform 106, probabilistic chaos component 108, microservice 1 110*a*, microservice 2 110*b*, and/or microservice 3 110*c* of FIG. 1. In some examples, computing environment 1100 can implement aspects of the process flows of FIGS. 5-10 to facilitate chaos engineering in microservices using a service mesh.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        determining a graph based on a group of microservices, a node of the graph representing a microservice of the group of microservices, and an edge of the graph representing a communication between two micro services of the group of microservices;
        determining respective probabilities of being selected for having a failure condition introduced for the microservices of the group based on a defined importance criterion of a corresponding node of the graph in causing the group of microservices to operate together;
        selecting a microservice of the group of microservices based on the probabilities of being selected for having the failure condition introduced, resulting in a selected microservice; and
        causing a failure condition to the selected microservice.

2. The system of claim 1, wherein performing the determining of the graph is performed by a component that is separate from the group of microservices.

3. The system of claim 2, wherein the group of microservices sends information about data transfer between the microservices of the group to the component.

4. The system of claim 3, wherein the component identifies a first node of the graph as a source of the data transfer between the microservices, and identifies a second node of the graph as a destination of the data transfer between the microservices.

5. The system of claim 4, wherein the component identifies the edge of the graph as the edge between the source and the destination.

6. The system of claim 1, wherein performing the determining of the graph comprises analyzing the microservice of the group of microservices to determine what other microservices of the group of microservices to which the microservice is configured to send data.

7. The system of claim 1, further comprising:
    normalizing the respective priorities for the micro services of the group before performing the selecting of the microservice.

8. A method, comprising:
identifying, by a system comprising a processor, data flow between a group of microservices;
assigning, by the system, respective probabilities of being selected for having a failure condition introduced to the group of microservices based on the data flow; and
introducing chaos, by the system, to a microservice of the group of microservices based on the respective probabilities of being selected for having the failure condition introduced of the group of microservices.

9. The method of claim 8, wherein performing the assigning of the respective probabilities of being selected for having the failure condition introduced comprises:
applying, by the system, an exponential decay series to the group of microservices.

10. The method of claim 8, wherein performing the introducing of the chaos to the microservice comprises:
causing, by the system, a failure of the microservice.

11. The method of claim 8, wherein performing the assigning of the respective probabilities of being selected for having the failure condition introduced comprises:
determining, by the system, respective centrality scores for the group of microservices.

12. The method of claim 11, wherein performing the determining of the respective centrality scores comprises:
determining, by the system, the respective centrality scores based on a number of inbound edges of a graph based on performing the identifying of the data flow.

13. The method of claim 11, wherein performing the determining of the respective centrality scores comprises:
determining, by the system, the respective centrality scores based on a number of outbound edges of a graph based on performing the identifying of the data flow.

14. The method of claim 11, wherein performing the determining of the respective centrality scores comprises:
treating, by the system, edges of a graph as undirected edges of an undirected graph, the graph being based on performing the identifying of the data flow; and
determining, by the system, the respective centrality scores based on the undirected graph.

15. A non-transitory computer-readable medium comprising instructions that, in response to execution, cause a system comprising a processor to perform operations, comprising:
determining a service mesh graph for microservices;
assigning respective weights to the microservices based on the service mesh graph, wherein the respective weights are assigned based on a measure of importance, determined based on a defined importance criterion, of a corresponding node in a service mesh graph in causing the group of microservices to operate together; and
selecting a microservice of the microservices for inducing chaos based on the respective weights to the microservices.

16. The non-transitory computer-readable medium of claim 15, wherein the operations further comprise:
determining that the microservice has been assigned a weight of zero; and
increasing the weight of the microservice to a value above zero.

17. The non-transitory computer-readable medium of claim 15, wherein performing the selecting of the microservice comprises:
performing the selecting the microservice based on the microservice having a largest weight of the microservices.

18. The non-transitory computer-readable medium of claim 15, wherein the microservices comprise a plurality of microservices each having a proxy of a plurality of proxies, the plurality of proxies routing communications between the plurality of microservices.

19. The non-transitory computer-readable medium of claim 15, wherein the microservice is a first microservice, and wherein the operations further comprise:
in response to determining that less than a threshold amount of time has elapsed, selecting a second micro service of the microservices for inducing chaos based on the respective weights to the microservices.

20. The non-transitory computer-readable medium of claim 15, wherein a first weight of the microservice indicates a probability that the microservice will be selected among the microservices for inducing chaos.

* * * * *